United States Patent Office 3,396,649
Patented Aug. 13, 1968

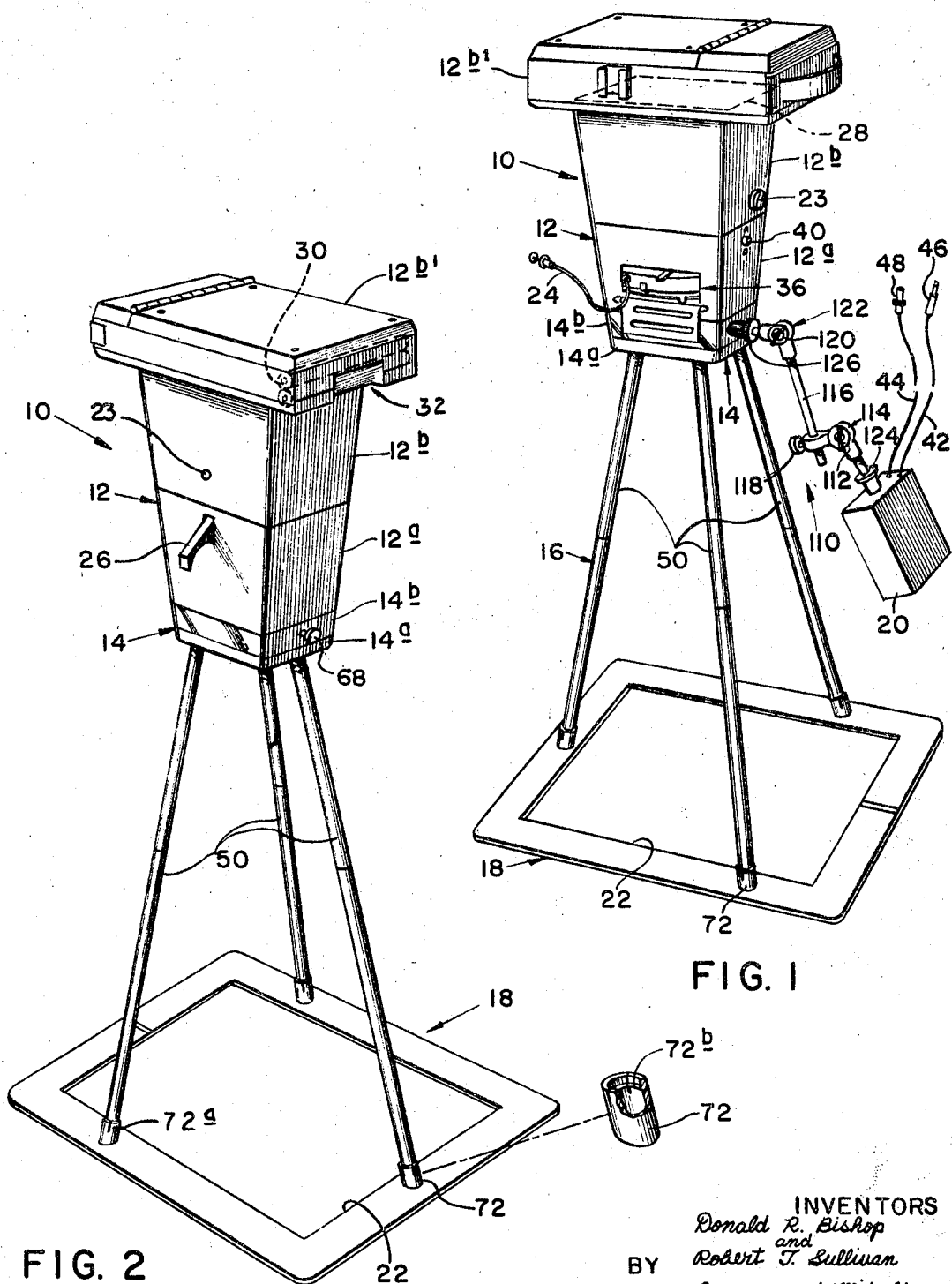

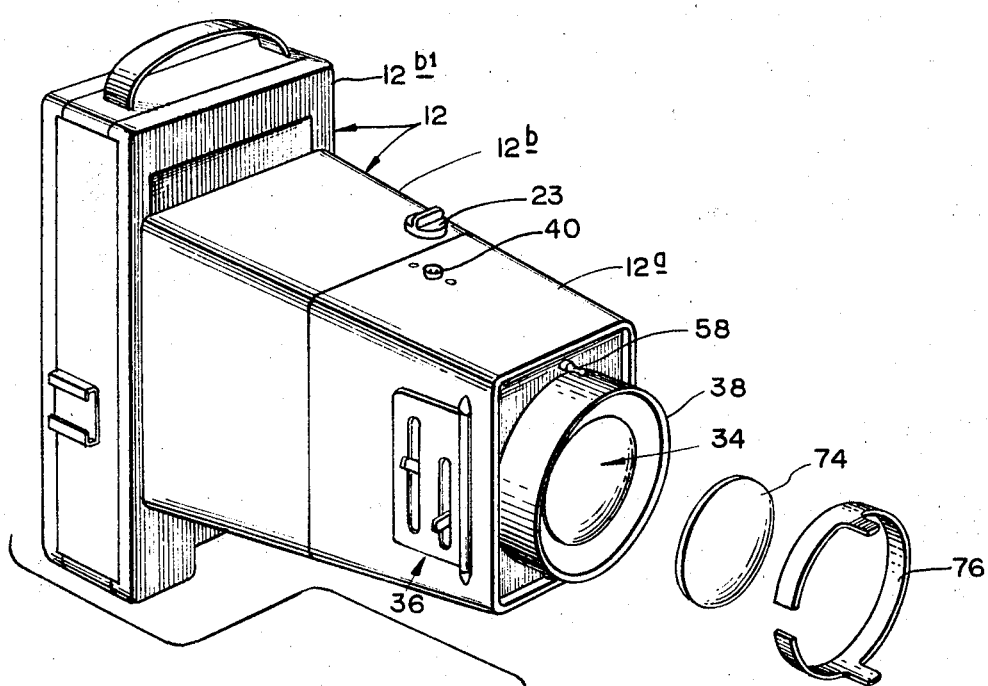
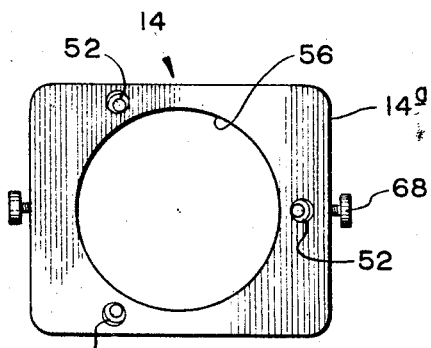
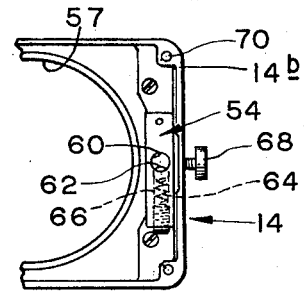
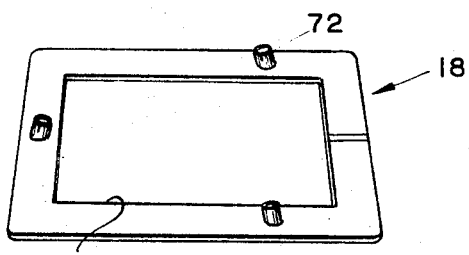

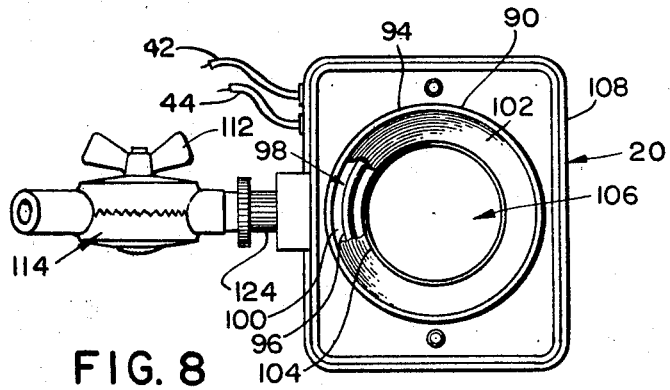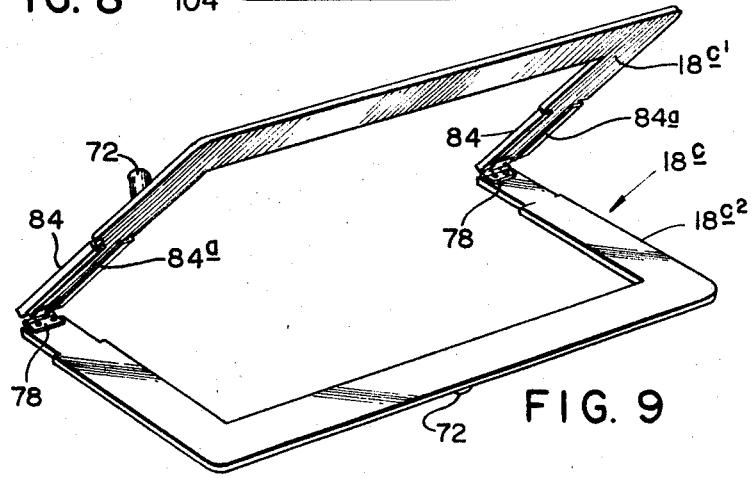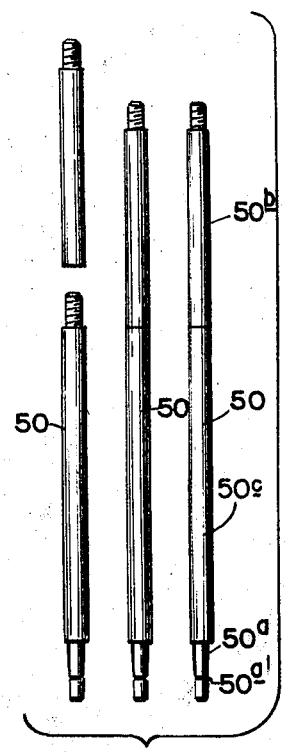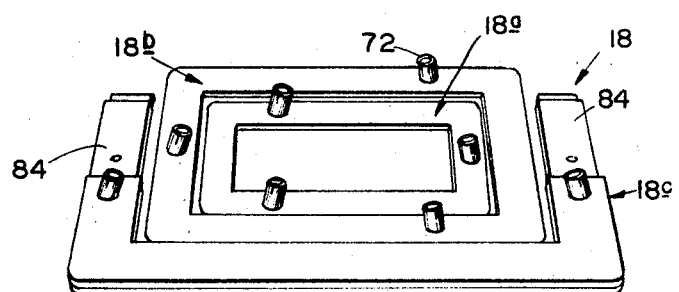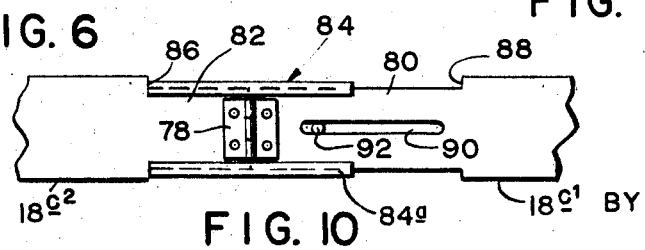

3,396,649
**PHOTOGRAPHIC MOUNTING AND
CONVERSION DEVICE**
Donald R. Bishop, Westwood, and Robert T. Sullivan,
Norwood, Mass., assignors to Polaroid Corporation,
Cambridge, Mass., a corporation of Delaware
Filed Mar. 18, 1966, Ser. No. 535,468
2 Claims. (Cl. 95—86)

This invention relates to photographic apparatus and especially to a conversion device or assemblage of related components for transforming a hand-held camera of a given type which, basically, is largely adapted to close-range photography in fields requiring magnification of subject material, to a firmly mounted instrument having adaptability in new categories of usage wherein, in general, extreme steadiness of focus, larger field sizes and smaller image-to-subject ratios are involved and rendered possible.

The device of the present invention is adapted to incorporation with the so-called "CU-5" closeup camera, sold by Polaroid Corporation of Cambridge, Mass., U.S.A., for the purpose of appreciably broadening its field of usage. While adding to the versatility of this camera, the device is easily set up and dismantled and is so compact as to be readily transportable.

The aforesaid camera is described in detail in the copending U.S. patent applications Ser. Nos. 422,149, now Patent No. 3,330,193, 422,276, now abandoned, and 422,254, now Patent No. 3,295,425, filed Dec. 30, 1964. It is also treated with respect to its applications to the specialized fields of dentistry and ophthalmology, respectively, in the copending U.S. patent applications Ser. No. 517,541, filed Dec. 30, 1965 and Ser. No. 524,592, filed Feb. 2, 1966. Whereas the foregoing references describe the camera in terms of three separable housing sections including a central section or ratio multiplier, and alternative front sections containing lenses of either 3-inch or 5-inch focal length, the camera, as employed herein, includes but the two sections illustrated and the 5-inch lens.

Augmented fields of usage of the aforementioned camera to which the subject device contributes comprise, for example, those of thin-layer chromatography, electrophoresis plate photography, petri dish and other organic transient recording, and metallurgy. When utilizing an auxiliary angularly-adjustable ring-light component, the device is especially contributive to the photographic recording of objects having surface irregularities or contours. It is also well adapted to a wide variety of general copy work.

The foregoing camera embodies the well-known self-processing features associated with cameras manufactured by the Polaroid Corporation, whereby a finished print is produced within a matter of a few seconds following the photographic exposure. It is adapted to use either black-and-white or color film as, for example, a "Type 107" black-and-white film assembly or a "Type 108" color film assembly, both sold by the Polaroid Corporation, the color film being that predominantly contemplated herein. Each print-carrying area of the film assembly is of a rectangular shape measuring approximately 3¼ x 4¼ inches. The film assemblies are supplied in the form of a film pack and each incorporates a releasably-contained processing liquid which is released, after the photographic exposure, by processing mechanism of the camera and spread throughout the exposed silver halide emulsion, the print being formed by a diffusion transfer process involving imbibition of the liquid into at least one of the layer components of the film assembly.

In accordance with the aforesaid considerations, objects of the invention are to provide a device or assemblage for converting, at will, a hand-held camera to a vertically-mounted, firmly-supported close-range camera adapted to the photographing of a plurality of subjects at various given field sizes and at a plurality of given image-subject ratios without focusing adjustment; to provide a knockdown device of the character described which may be condensed into a small area for carrying purposes; to provide a device as stated which includes a choice of differential illuminating means; to provide a device of the aforementioned category wherein supporting leg members are in the form of a tripod and wherein their lower extremities are held against lateral displacement by holding means of a frame-like base element which latter also serves to delineate a given field size; to provide a frame-like base element as characterized which is hingedly foldable to a more compact form for carrying purposes; to provide a set of tripod leg members which are individually separable into sections to produce additional sets of leg members of various shorter lengths both for focusing and transport functions; and to provide a device of the character described for use with a short-range camera incorporating the aforementioned self-processing features thereby producing, overall, an extremely rapid, flexible and inexpensive general copying instrument.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a diagrammatic perspective view of a camera and associated apparatus of the invention, including auxiliary illuminating means and illustrating the upper surface of the camera;

FIG. 2 is a diagrammatic perspective view of the camera and associated apparatus, without the auxiliary illuminating means and showing an opposite side of the camera;

FIG. 3 is a diagrammatic perspective view of the camera turned on its side and including an auxiliary lens and lens-retaining element;

FIG. 4 is a diagrammatic front view of a mounting adapter, releasably attachable to the front of the camera and, in turn, supporting the tripod and auxiliary illuminating means;

FIG. 5 is a diagrammatic fragmentary rear view of the adapter of FIG. 4;

FIG. 6 is a diagrammatic view of the tripod legs;

FIG. 7 is a diagrammatic perspective view of a rigid supporting base element;

FIG. 8 is a diagrammatic front view of an auxiliary electronic flash unit incorporating a ring light;

FIG. 9 is a diagrammatic perspective view of a folding or collapsible supporting base element;

FIG. 10 is a diagrammatic fragmentary view of locking means incorporated with the foldable base element; and FIG. 11 is a diagrammatic perspective view of several of the supporting base elements, illustrating their relative size and nesting capability for transport purposes.

Referring now to FIGS. 1 and 2, a vertically disposed assemblage 10 consisting of components of the self-processing short-range camera 12, the mounting adapter 14, the tripod 16, the frame-like base 18 and the auxiliary electronic flash unit 20 is illustrated in readiness for photographing an object to be positioned within the area defined by the aperture 22 of the base 18. It will be noted that the auxiliary flash unit 20 has been removed in FIG. 2. The camera 12 is essentially similar to the standard "CU–5" camera, above mentioned, with the exception that it is without a removable pistol grip, insertable in the threaded aperture 23, which may be used when the camera is hand-held; that it is limited to two separable sections, namely, a front section 12a and a rear section 12b releasably held together by latching means 23; that it includes, for alternative use, a cable shutter release 24 or a trigger shutter release 26; and that it utilizes certain supplementary lenses, to be described in some detail below.

The section 12b includes the camera back 12b$^1$ which is adapted to accommodate the aforementioned film pack and position each unit thereof successively at a focal or film plane 28. It also embodies conventional processing mechanism in the form of compressive means, such as a pair of pressure rolls 30, for releasing the processing liquid of each film unit and an exit aperture 32 through which the film unit is withdrawn after passage between the compressive means.

The foremost portion of the front section 12a of the camera also includes, generally within the lens aperture 34 (FIG. 3), the aforesaid lens, e.g., a Rodenstock 5-inch lens, together with a diaphragm adapted to a setting range of $f/4.7$ to $f/45$, and a shutter, such as a Prontor self-cocking shutter, capable of speeds of from $1/125$ second to "time." Control of the shutter and diaphragm settings is provided by the cooperating lever and indicia means at 36. A built-in circular electronic flash unit or ring light 38 surrounds the lens aperture 34 and is energized by a remote power pack unit, not shown, and conventional shutter contacts at "$x$" synchronization. When the built-in flash unit 38, only, is employed, an electrical cable connects the recessed socket 40 with the power pack unit. When the auxiliary flash unit 20 is used, electrical cables 42 and 44 having plugs 46 and 48 adapted to connect the flash unit 20 with the power pack and with the socket 40, respectively, are utilized. When employing the auxiliary flash unit 20, with the electrical connections above described, the built-in flash unit 38 is automatically cut out of the circuit.

The mounting adapter 14 serves as an intermediate element for effectively attaching the legs 50 of the tripod to the camera. The adapter is formed of a suitable lightweight but rigid metal such as aluminum and includes a solid, e.g., cast, forward section 14a to which the threaded upper extremities of the tripod legs 50 are attached within the threaded bores 52, and an integral, rectangular, rear frame-like section 14b upon inner mounting portions of which, at laterally-opposite sides, is mounted a pair of socket elements 54 (one shown). Each of the sections 14a and 14b includes a circular, mutually-aligned, central aperture or bore 56 and 57, respectively, forming a continuous opening within which the flash unit 38 is accommodated. The sockets 54 are adapted to engage a pair of lugs 58 (one shown) which protrude forwardly from horizontally disposed locations on the front face of section 12a of the camera, the lugs and sockets together constituting releasable latching means.

Each socket includes detent means for releasably engaging one of the lugs 58 comprising an aperture 60, a ball component 62, an extension spring 64 urging the ball in a direction such that a peripheral portion thereof is aligned with the aperture 60, and guide means 66 for retaining, while permitting movement of, the ball and spring. Locking means in the form of a pair of screw elements 68 having knurled actuating knobs are inserted in threaded apertures at opposite sides of portion 14b of the adapter so as to bear against the lugs 58 when the latter are inserted and to firmly hold the adapter and camera in assembled relation, it being observed that the adapter and camera front conform in shape. Slightly protruding bosses 70, located at the four corners of section 14b of the adapter, serve to establish a correct positioning thereof in terms of distance, for example, from the film plane 28.

The lower extremities 50a of the tripod legs 50, somewhat tapered and of slightly reduced diameter, are adapted to be inserted in cup-like receptacles 72 fixedly mounted on, and extending upwardly from, the base element 18. The base or frame 18 is preferably composed of a suitable metal such as aluminum. The receptacles 72 are preferably formed of a resilient material, e.g., of a thermoplastic resin or a plastic such as polyethylene, and may also suitably have sectioned edge portions 72a to facilitate their being forced slightly apart by the tapered leg extremities 50a and firmly, although releasably, gripping the latter. A small inner bead 72b adapted to engage the recessed ring 50a$^1$ of the leg extremity further contributes to the holding property of the cup 72.

It will be noted that a plurality of frame-like bases 18a, 18b and 18c is provided, each having an aperture 22 of relatively different area. In conjunction therewith, it is to be understood that a plurality of sets of the legs 50, each set being of a given differential length so as to form a tripod 16 of relatively differential height with respect to the plane of an associated base, is also provided. The tripod legs are invariably disposed at a given angle with respect to the optical axis of the camera, irrespective of which set of legs is employed, e.g., at an angle of approximately 16°. Accordingly, the different field sizes of the base elements are predetermined with respect to the given fixed flare or angle of the tripod legs and the given lengths of the legs of each set. In conjunction with the aforesaid sets of base frames 18 and tripods 16, it is also to be understood that a plurality of supplementary lenses 74, of given diopter values, and an accompanying resilient, manually-compressible, retaining ring 76 are employed. Each lens is inserted in the lens aperture 34 to a given depth, as provided by a conventional bezel within the latter, and is held mounted therewithin by the expanded ring 76.

It will be observed that each of the tripod legs 50, assuming them to be of a maximum length, is composed of two sections 50b and 50c which are adapted to be threadedly connected with one another. This permits the legs to be shortened so as to occupy less space for carrying purposes. The sectioned structure may also be employed to enable each of the legs 50 to provide, per se, three different functional lengths or, otherwise stated, three different heights of the tripod as, for example, by providing short threaded inserts of the form of the extremities 50a for the sections 50b. Accordingly, the complete length of the joined sections would provide one functional length; sections 50b a second functional length; and sections 50c a third functional length for varying the height of the tripod. With reference to the above-described constructions, involving an effectively unitary structure of the legs when the leg sections 50b and 50c are screwed together and when the legs are firmly anchored in the frame-like base elements 18, a rigidity and firmness of the camera mounting is obtained which cannot be duplicated by a telescoping type of leg structure or one which permits a possible lateral movement of their lower extremities when the assembly is subjected to a vibrational or other force tending to dislodge them.

The frame-like elements 18, of given size and structure, may be arranged or stacked compactly, as shown in FIG. 11, for carrying purposes. While three of these elements are illustrated, a larger number may be provided, as required, in conjunction with additional sets of legs 50 and supplemental lenses 74. Compactness of a base element or elements for the aforesaid transport purpose is facilitated by providing a hinged or foldable structure of the largest of the base elements, such as that of the base element 18c, illustrated in FIGS. 9, 10, and 11. This structure includes the pair of hinges 78, pivotally joining the adjacent frame extremities 80 and 82 of the base half-sections 18c$^1$ and 18c$^2$; the similarly reduced width but differential length of the frame portions 80 and 82; and the elongated rectangular locking member 84, having overturned edges 84a, adapted to slidable movement along the extremities 80 and 82 when the base element 18c is fully opened to a functional configuration. In FIG. 10, the locking member 84 is shown at its locking position, having been slid along the frame portions 80 and 82 into contact with limit-stop means 86 provided by the inwardly-extending edges of the half-section 18c². To assume the release position, the locking member is slid in an opposite direction until it contacts the limit-stop 88 provided by the inwardly-extending edges of the half-section 18c¹. The release position of the locking member 84 is illustrated in FIGS. 9 and 11. Means for preventing member 84 from inadvertently falling off of the frame portion 80 when at the release position include the slot 90 formed in portion 80 and the protuberance or pin 92 slidably extending therewithin from the locking member 84 and adapted to contact the end of the slot adjacent thereto, as shown in FIG. 9, for the purpose. It will be noted that the length of the slot necessarily exceeds that of the length of travel of the element 84 for locking or release purposes.

The function of the auxiliary electronic flash unit 20 is primarily that of projecting light at a chosen acute angle upon subject matter located within the aperture 22 of any of the frame-like bases 18 which may be utilized. This type of illumination may well be desirable and produce heightened "information" when the subject matter includes surface irregularities such that an acutely angularly-directed beam will cast small shadows thereof, thus revealing or emphasizing the surface contours. The auxiliary electronic flash unit 20 is basically similar to the unit 38 incorporated with the camera in that it includes a circular metallic casing portion 94 and a generally-conventional ring-type gaseous flash tube 96 mounted in an annular compartment 98 formed within the casing 94. At the rear of the compartment 98 is a reflector 100 and, across its front, is an annular light-transmitting protective plate 102. The aforesaid elements surround a forwardly-extending flange 104 defining a circular aperture 106. The aforesaid structure, in turn, is mounted in a rectangular casing 108.

The auxiliary flash unit 20 is mounted on the mounting adapter 14 by a bracket 110 which is manually adjustable to permit the unit to project its illuminating rays toward the subject area at any desired angle. For this purpose the bracket 110 includes the screw-and-wing-nut 112 of the coupling 114 permitting, when the wing-nut is loosened, rotation of the flash unit in a first place about the axis of the screw, as determined by the then-existing rotational position of the coupling 114 relative to the rod 116. The latter position is established by the adjusting screw 118. Rotation, as a unit, of the rod 116, coupling 114 and flash unit 20 may be achieved by loosening the wing-nut of the wing-nut-and-screw 120 identified with the coupling 122. This rotation about the screw of the component 120 may occur in the first plane or in another plane depending upon the aforesaid rotational position of the coupling 114 on the rod 116. The thumb screws 124 and 126 are provided for threadedly attaching the bracket 110 to the flash unit 20 and adapter 14, respectively. It will be understood that portions of the couplings 114 and 122 are of a split construction to permit the relative rotation or the locking of one half thereof with respect to the other half. If it is desired to use the auxiliary flash unit 20, alone, as an illuminating source as, for example, behind a light-transmitting type of photographic subject, it may be removed entirely from the bracket 110 by loosening the thumb-screw 126. It may be employed for such a purpose, for example, in conjunction with a suitable mounting platform adapted to be positioned at a given location beneath the camera.

Fitting together of the several components of the present invention to make up the assemblage of FIG. 1 is preferably performed according to the following sequence. The selected supplemental lens 74 is placed in the lens aperture 34 and is locked in position by inserting the retaining ring 76. Each of the legs 50 of a given set is attached to the mounting adapter 14. The adapter 14 is attached to the correctly related frame-like base 18. The adapter 14 is then mounted on the front section 12a of the camera 10. If an acute angle of illumination is required, the auxiliary electronic flash unit 20 is mounted on the adapter 14 and the bracket 110 is adapted in the manner required in conformance with the characteristics of the photographic subject. Disassembly of the components follows a reverse order of the above-described steps.

The following table illustrates the optical considerations relating to optional assemblages of the tripod components 50, the frame-like bases 18 and the supplemental lenses 74.

| Tripod Set | Spacing 1st Nodal Point of 5-inch Lens to Subject inches | Supplemental Lens Diopter | Field Size | Image-to-Subject Ratio |
|---|---|---|---|---|
| Not illustrated | 2.5 | 0 | 11.5 x 15 | .250:1 |
| 18c | 18.9 | ½ | 8.62 x 11.25 | .333:1 |
| 18b | 13.2 | 1½ | 5.94 x 7.74 | .484:1 |
| 18a | 9.094 | 3 | 4.04 x 5.27 | .712:1 |

Since certain changes may be made in the above apparatus without departing from the scope of the invention herein involved, it is intended that all matter contained in the above description or shown in the accompanying drawings shall be interpreted as illustrative and not in a limiting sense.

We claim:
1. A knockdown, readily-compacted and transportable device for so mounting a hand-held close-range type of camera as to enable positioning said camera vertically at a plurality of given heights above a subject plane as to augment its utility in conjunction with the use of supplemental lens means of given characteristics for varying focal lengths, said device comprising a mounting adapter providing a substantially conforming frontal extension of the camera housing and including latching means at a rear surface releasably-attachable to complementary latching means at a front surface of said camera, a plurality of sets of releasable leg members of relatively different length, each set being composed of three legs so releasably attachable at their upper extremities with divergingly-angled frontal surface engaging means of said mounting adapter as to form, when engaged, a tripod flaring outwardly toward its lower extremities, a plurality of rectangular frame-like base elements of relatively different size, each defining a photographic field size and including a plurality of short, upwardly-extending, convergingly-angled, cup-like receptacles for releasably accepting and firmly engaging said lower extremities of one given set of said leg members, the flared characteristics of said leg members providing relatively large field sizes within the confines thereof, the largest of said base elements being of a folding type including two U-shaped half-sections of substantially equal dimensions pivotally connected to one another at their extremities for compacting said largest base element, when pivoted to closed position, to approximately one-half of its dimensions at open functional position, said base element including slidable locking means adapted at one location to overlap adjacent portions of said half-sections for holding said base element firmly at said open position, and at a second location when removed from one of said adjacent portions permitting folding of said half-sections upon one another, other of said base elements being of a non-folding type and adapted to nest within said largest base element and within one another according to their diminishing size so as to occupy a minimum of space for transportation purposes.

2. A camera mounting device, as defined in claim 1 wherein each of said leg members includes at least two threadedly-engageable sections of relatively different length, each three sections of a similar length constituting a given one of said sets of leg members, said leg members, when disassembled and when taken with said folding and nesting of said base elements, contributing to the compactness of said device when disassembled for transportation purposes.

References Cited

UNITED STATES PATENTS

| | | | |
|---|---|---|---|
| 1,837,704 | 12/1931 | Dean | 88—24 |
| 2,277,448 | 3/1942 | Munsinger | 88—24 |
| 2,626,537 | 1/1953 | Flank | 88—24 |
| 3,298,294 | 1/1967 | Manning | 88—24 |

FOREIGN PATENTS 1,021,707  12/1957  Germany.

JOHN M. HORAN, *Primary Examiner.*